(No Model.) 2 Sheets—Sheet 1.
M. REW.
COMBINED HAY RAKE AND TEDDER.
No. 452,319. Patented May 12, 1891.
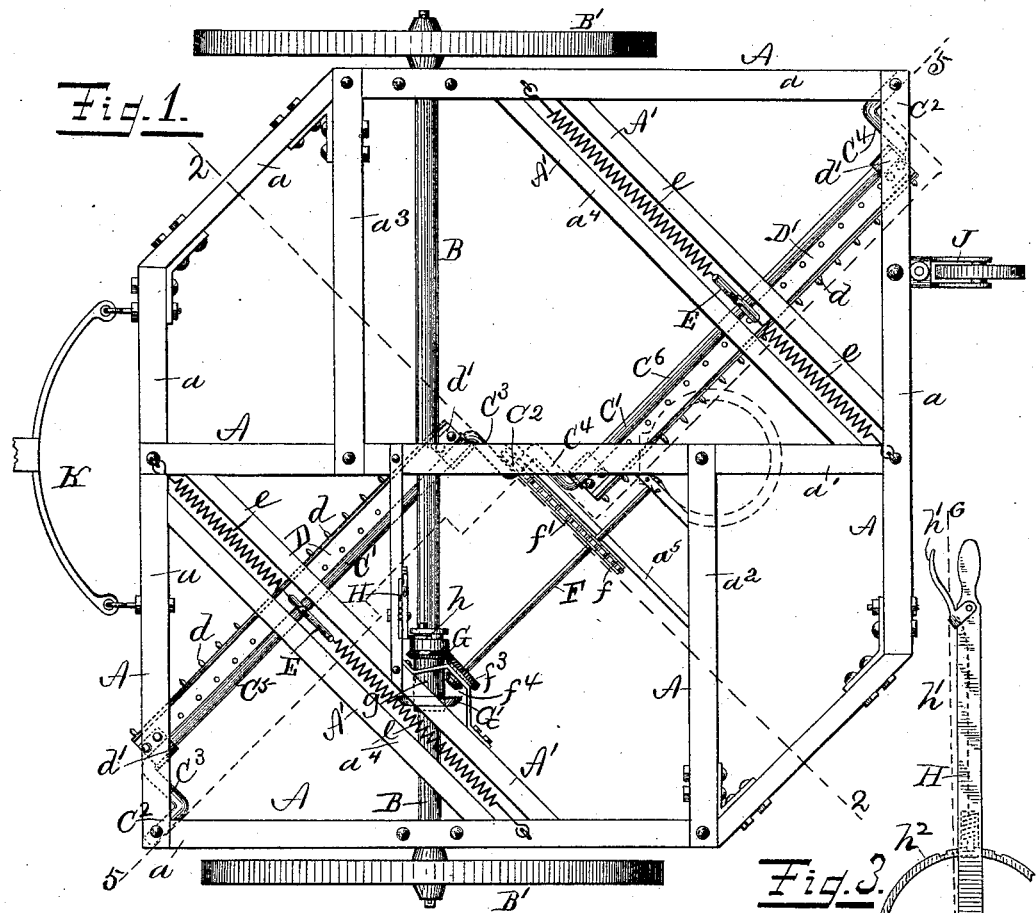
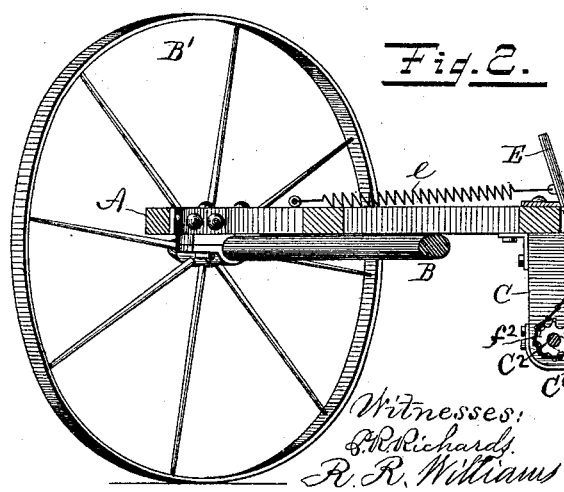
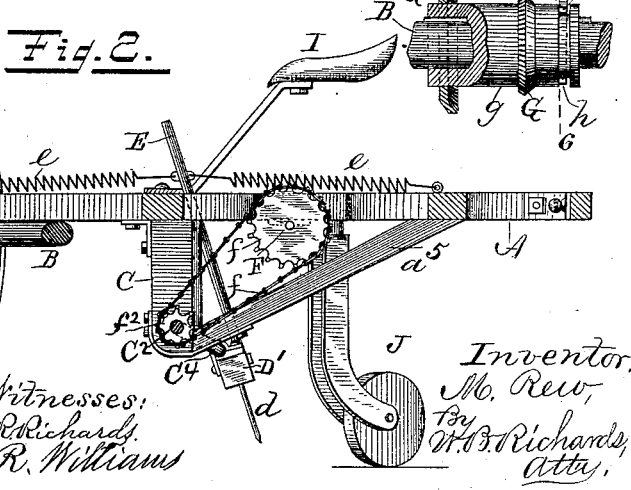

(No Model.) 2 Sheets—Sheet 2.
M. REW.
COMBINED HAY RAKE AND TEDDER.
No. 452,319. Patented May 12, 1891.
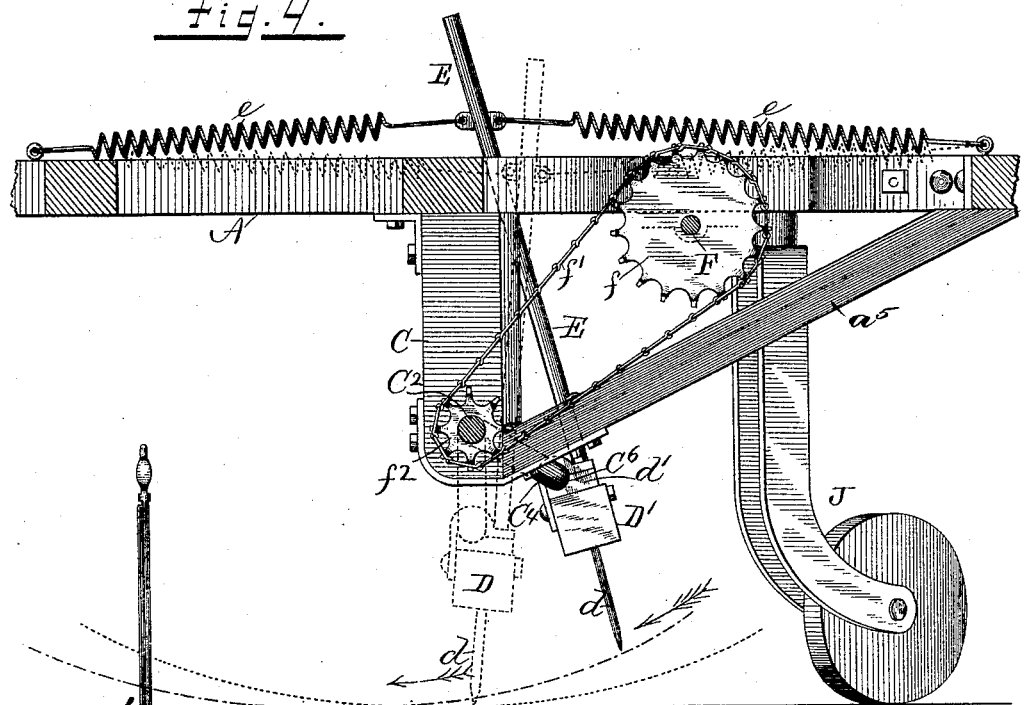
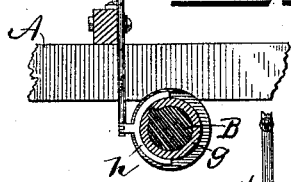
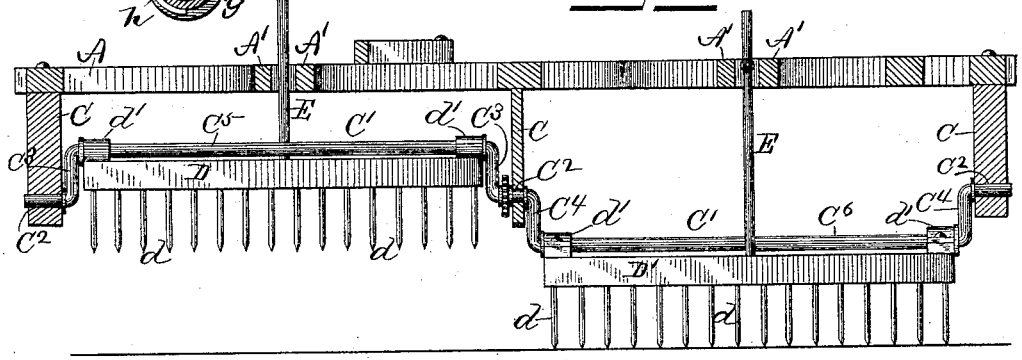
Witnesses:
S. R. Richards.
A. R. Williams
Inventor:
M. Rew,
By W. B. Richards,
Atty.

UNITED STATES PATENT OFFICE.

MADISON REW, OF GRINNELL, IOWA, ASSIGNOR OF ONE-THIRD TO THE CHAMBERS, BERING, QUINLAN COMPANY, OF DECATUR, ILLINOIS.

COMBINED HAY RAKE AND TEDDER.

SPECIFICATION forming part of Letters Patent No. 452,319, dated May 12, 1891.

Application filed January 3, 1888. Serial No. 259,583. (No model.)

*To all whom it may concern:*

Be it known that I, MADISON REW, a citizen of the United States, residing at Grinnell, in the county of Poweshiek and State of Iowa, have invented certain new and useful Improvements in Combined Hay Rake and Tedder, of which the following is a specification.

This invention relates to that class of horse hay-rakes in which a rake located on the machine obliquely to its line of travel is used to gather the hay into windrows at the side of the apparatus and in line with or parallel with the path of the rake. In this class of rakes as heretofore constructed the obliquity of the rake to its path of movement has alone been depended upon to move the hay laterally in some cases, and in others such obliquity together with an ordinary rotating rake-head with radial rake-teeth, and in others still such obliquity together with rake-teeth carried on endless belts and having a continuously lateral movement; and it will be evident to any one skilled in this art that in so moving the hay it will be crowded and pressed together, and that the action of the rake in so moving it laterally will be very imperfect.

The main object of my invention is to overcome these difficulties by furnishing a rake which will have an orbital movement independently of and in addition to its ordinary forward motion of progression, by means of which additional movement the hay will be tossed or thrown forward and laterally to loosen it up, and thereby facilitate curing it, and more especially to facilitate its movement toward the side of the machine or apparatus; and to the end of carrying out this main object my invention consists, in its main feature, in a rake of the oblique class hereinbefore referred to, mounted on a crank-shaft, which is geared with the supporting-wheels in such manner that the rake-teeth will be given periodic orbital forward and lateral movements in directions oblique to the line of travel of the machine, and independently of but in connection with the ordinary progressive movement of the entire machine across the meadow.

A further feature of this invention consists in a rake of the oblique type having the orbital, oblique, forward, and lateral movements hereinbefore described in general terms formed in two or more parts, each part carried on a crank-shaft which has a throw or movement independent of the other part or parts of said crank or cranks, in such manner as to give the parts of the rake alternating movements, whereby each rake will not only at each sweep of its teeth over the surface of the field lift and toss the hay obliquely forward and toward the side of the machine, and each tooth thereby move the hay laterally to be caught and again so moved by the next and following teeth, but each rear rake of the series of rakes acting alternately with will also receive the hay from its preceding rake and move it in same manner on toward the side of the machine, where it is delivered in a windrow parallel with the line of travel of the machine. The rake-teeth being held in an approximately vertical position having orbital movements, as described, will greatly aid them in moving the hay laterally from each preceding to each following tooth, and from each preceding section of rake to its following section.

A further feature of my invention consists in a reversing-gear, by means of which the rakes are given an orbital motion in a reverse direction or a backward motion as they sweep over the surface of the meadow for the purpose of stirring and spreading the hay as a tedder.

The invention further consists in combinations and constructions hereinafter described and claimed.

In the accompanying drawings, which illustrate one method of embodying my invention in a practical hay-raking, windrowing, and hay-tedder implement, Figure 1 is a top plan of a hay rake and tedder embodying my invention; Fig. 2, a sectional elevation in the line 2 2 in Fig. 1; Fig. 3, a detail showing the lever and fragments of other parts used in reversing the motion of the rakes. Fig. 4 is an enlarged elevation of a portion of the parts shown at Fig. 2; Fig. 5, a sectional elevation in line 5 5 in Fig. 1, showing the rakes, the cranks, and parts of the frame; Fig. 6, a sectional elevation in the line 6 6 in Fig. 3.

The same reference-letter is used to designate the same part in the different figures of the drawings.

The frame A may be formed, as shown, of exterior frame-bars $a$, longitudinal bar $a'$, transverse bars $a^2$ $a^3$, and two sets of oblique bars $a^4$. It will be evident, however, that this frame may be formed in many other ways to act as a supporting-frame for the operating parts of the machine, and is mounted on a rotating axle B, which is carried by the frame-supporting wheels B', which wheels are fixed to said axle and rotate it as the implement is drawn across the meadow. Other pendants C extend downwardly from the frame A, and are provided with suitable bearings for a crank-shaft C'. The pendants C are located in a line oblique to the axle B and to the line of travel of the machine, and the two outer pendants are fixed to the exterior frame-bars, while the central pendant is fixed to the bar $a'$ and held by a brace $a^5$.

C' is a crank-shaft journaled at $C^2$ in the pendants C, oblique to the line of the travel of the machine, and has oppositely-disposed cranks $C^3$ and $C^4$, which crank $C^4$ has ordinary shaft or wrist $C^5$, and crank $C^4$ has ordinary shaft or wrist $C^6$, thus forming a two-throw crank-shaft, or crank-shaft having throws or movements of its cranks $C^3$ and $C^4$ alternating with each other.

A rake head or section D, with teeth $d$, is connected by journals or bearings $d'$ with the shaft $C^5$, and a similar rake head or section D' is similarly connected with and similarly mounted on the shaft $C^6$. Each rake head or section D and D' has an arm E fixed thereto, and each arm E extends upwardly between two frame-bars A'. Each arm E has a spring-rod $e$ extending forwardly and another rearwardly to and connected with any suitable part of the frame and having sufficient tension to hold the rakes, with their teeth, at all times in substantially perpendicular or upright working positions with reference to the rake-frame, while they will yield to permit the rakes to pass freely over obstructions and to adapt themselves to uneven surfaces. In fact, the springs $e$ are yielding rake-holders adapted to hold the rakes substantially perpendicular or in upright working positions and render them yielding, and it will be evident that they may be fixed to operate on the rakes in various ways.

A rotative motion is imparted to the crank-shaft C' as follows: A shaft F, having suitable bearings in the frame A, has a sprocket-wheel $f$, geared by a sprocket-chain $f'$ with a sprocket-wheel $f^2$, which is carried on the central part $C^2$ of the crank-shaft C'. Motion is given to the shaft F by either of the cog or bevel gears G G', both of which are carried by a sleeve $g$, which slides on and rotates with the axle B. As shown at Fig. 1, a larger cog-wheel $f^3$ on the shaft F is in gear with the smaller cog-wheel G on the sleeve $g$ to give a slower motion to the rake-carrying crank-shaft C' when used as a rake. By sliding the sleeve $g$ on the axle the larger cog-gear G' may be brought into contact with the smaller cog-wheel $f^4$ on the shaft F to give a more rapid and reverse motion to the rake-carrying crank-shaft. The sleeve $g$ is shown more plainly at Figs. 3 and 6, and is slid or adjusted by a lever H, having arms or yoke $h$, partly encircling said sleeve, and is provided with an ordinary pawl or lock lever $h'$, which engages with a rack-bar $h^2$ to lock the pinions $f^3$ and G in gear or the pinions $f^4$ and G', or to lock all out of gear, for the purpose of moving the machine without operating the rakes by locking the lever so as to hold the pinions $f^3$ and $f^4$ between and out of gear with either pinion G or G'.

The driver's seat I (shown at Fig. 2 in full lines and at Fig. 1 in dotted lines) is located on the bar $a'$ of the main frame, preferably in rear of the axle B; but it will be evident that it may be otherwise located, if preferred. A caster-wheel J supports the part of the frame A in rear of the axle, and thereby supports the weight of the driver.

When the machine is drawn forward by the tongue K and the pinions $f^3$ and G are thrown into gear, as hereinbefore described, the direction of rotation given to the shaft F by said pinions is such that the gearing of shaft F with the crank-shaft carrying the rakes will give motion to said crank-shaft and rakes in the directions, respectively, which will cause the rakes to throw or move the hay laterally and forwardly, as hereinbefore described, and for the purpose of raking the hay into windrows. When it is desired to use the machine as a tedder, while still drawn forwardly, as when used as a rake, the sleeve $g$ is moved by the lever H to throw the pinions $f^3$ and G out of gear and to bring the pinions $f^4$ and G' into gear. The pinion $f^3$, it will be seen, engages with the pinion G' on the opposite side of the shaft F from the gear of the pinions $f^4$ and G, and hence rotates the shaft F and the crank-shaft which carries the rakes in a different direction from the rotary motion given the same parts by the pinions $f^3$ and G when in gear, and thus causes the rakes in their orbital motion to throw or toss the hay rearwardly as the machine moves forwardly, and thereby act as a hay-tedder.

When used as a rake, the orbital motion of the crank-shaft will give an orbital motion to the rakes, and thus give a partially forward and partially lateral or obliquely forward movement to each rake as it reaches and sweeps along the surface of the meadow, as indicated by dotted lines at Fig. 4.

The movements of the rakes hereinbefore described are such that in raking the hay will not only be thoroughly stirred, but will be moved effectually toward the side of the machine, as the hay which is thrown forwardly and laterally, or obliquely forward, by each obliquely-forward throw of the upright working rake-teeth will, so much thereof as is not delivered by such throw to the windrow at the side of the machine, be again caught by the rake and again thrown in same manner until so delivered or discharged, and the hay thrown laterally and forwardly by each preceding section of the rakes will in turn be again so thrown or moved forwardly and laterally by the succeeding or next following rake-section, which rake-sections, thus acting successionally on the hay will finally deliver it at the side of the machine in a windrow parallel with or coincident with the line of travel of the machine.

When the sleeve $g$ is adjusted to throw the pinions $f^4$ and $G'$ into gear, as hereinbefore described, the rake-teeth will then be swept backwardly with reference to the forward motion of the implement, and will throw the hay backwardly and effectually spread and scatter it as a tedder.

It will be evident that one rake, when given the motion herein described by a crank with a single throw, will move the hay laterally with effect; but I prefer two rakes or rake-sections, as shown, which operate alternately by means of a two-throw crank, and, in fact, more than two rakes or rake-section, may be used, if preferred, with cranks having more than two throws, whereby said rake-sections will be given alternating and successional throws, so that they will, each preceding section, move or throw the hay laterally and forwardly, to be acted on by its following or succeeding section in same manner.

I am aware that rotating straight shafts located on the machine obliquely to its line of travel, and provided with radial rake-teeth fixed to said shaft, are shown in English Patent No. 1,737 of 1877, and I do not claim such as my invention, in which a rotating crank-shaft is used, which crank-shaft is located on the machine obliquely to its line of travel, and carries rake-teeth which are journaled thereon in such manner that said teeth by the rotation of the crank-shaft are given an orbital motion and are held in substantially vertical positions, whereby, as they are swept along over the field with a forward and lateral movement, they will effectually move the hay laterally from one tooth to another, or from one series of teeth to another, without any tendency to lift and throw the hay upwardly and carry it around with the rotating rake, while a rake such as shown in said English patent will not so operate.

I am also aware that obliquely-located rakes are shown in United States patent to H. Willard, issued October 15, 1867, No. 69,881, and I do not claim such device, in which no crank-shaft is used, and in which the rake-teeth are carried on endless belts, the forward sides of which move toward the delivery side of the rakes; nor do I claim such device as shown in patent to A. Lasack, issued January 25, 1887, No. 356,541, in which no crank-shaft is used, and in which the rake-teeth are swung laterally by cranks on their upper ends. In fact, neither of the three patents recited shows any organization such as shown and described in my present application.

I am also aware of patents—such as the J. Skinner patent of February 3, 1885, No. 311,614—which show hay-tedder forks having an orbital motion and adapted to throw the hay rearwardly of the machine, and I do not claim such broadly, as my invention relates to a different organization and combination to that shown in the Skinner patent, and to such an organization and combination of parts, as by means of which I accomplish results hereinbefore described, and which results the Skinner device is not capable of producing.

Having thus described my invention, what I claim as new, and desire to secure by Letters Patent, is—

1. In a hay-rake, in combination with a suitable supporting-frame mounted on drive-wheels, a rotating crank-shaft located on said frame obliquely to the line of travel of the machine, a rake in line with said crank-shaft, to which it is journaled or hinged, whereby rotation of the crank-shaft will give orbital motion to the rake, and means for retaining the rake-teeth at all times, while in operation, in substantially perpendicular or upright working positions, as an arm or bar projecting from the rake-head and hinged directly or indirectly to the rake supporting-frame, substantially as and for the purpose specified.

2. In a hay-rake, in combination with a suitable supporting-frame mounted on drive-wheels, two or more rake-sections hinged or journaled to a rotating crank-shaft, having cranks with alternating and successional throws, each crank carrying its attached rake-section, to which it gives an orbital motion, whereby the rake-sections have with their operating-cranks alternate and successional throws, said crank-shaft located itself and also holding the rake-sections in positions oblique to the line of travel of the machine, whereby each rake-section will throw the hay obliquely forward in such manner that each preceding rake-section will deliver its hay to the rake-section which succeeds it in action in the series of such sections, and means for holding the rake-teeth in substantially perpendicular or upright working positions, substantially as and for the purpose specified.

3. In a hay-rake, in combination with a suitable supporting-frame mounted on drive-wheels, rakes hinged or journaled to a rotating crank-shaft, having bends or crank-arms extending therefrom in different radial planes, whereby they have alternating and successional throws, each bend or crank-arm carrying its attached rake, to which it gives an orbital motion, said crank-shaft located itself and also carrying the rakes or rake-sections obliquely to the line of travel of the machine on its wheels, means for holding the rakes in upright working positions while in operation, and intermediate-gear mechanism between the crank-shaft and the drive-wheels, by means of which the drive-wheels are made to rotate the crank-shaft and operate the rakes thereby, substantially as and for the purpose specified.

4. In a hay-rake, in combination with a supporting-frame mounted on drive-wheels, rakes hinged or journaled to a rotating crank-shaft having bends or crank-arms extending therefrom in different radial planes, whereby they have alternating and successional throws, each bend or crank-arm carrying its attached rake-section, to which it gives an orbital motion, said crank-shaft located itself and also carrying the rake-sections obliquely to the line of travel of the machine on its wheels, an arm extending from the rake-head and having a yielding connection with the supporting-frame for holding the rakes in upright working positions while in operation, and permitting them to yield to pass over obstructions, substantially as and for the purpose specified.

5. The combination, with the frame and rotating axle and wheels, of the crank-shaft with rakes hinged thereto oblique to the axle, an arm E, fixed to each rake-head, and a yielding spring-connector between said arm E and the supporting-frame, the actuating-shaft F, in gear with the crank-shaft and having pinions $f^3$ and $f^4$ at its forward end, and the sleeve $g$, sliding on the rotating axle and having pinions G G' to gear with $f^3$ or $f^4$, as desired, substantially as and for the purpose specified.

6. The combination, with the frame and rotating axle and wheels, of the crank-shaft with rakes hinged thereto oblique to the axle, an arm E, fixed to each rake-head, and a yielding spring-connector between said arm and the supporting-frame, the actuating-shaft F, geared with the crank-shaft, and having pinions $f^3$ and $f^4$, the sleeve $g$, sliding on the axle and having pinions G G' to gear, respectively, therewith, and the slipping and locking lever H, substantially as and for the purpose specified.

7. In combination with a frame and the obliquely-located rotating crank-shaft with the rakes hinged thereto, substantially as described, the rods E, projecting from the rake-heads, with springs connected at one end to the rods E and at their other ends with the frame A, and which hold the rakes in substantially vertical positions, while yielding to permit the rakes to have certain movements, substantially as and for the purpose specified.

8. In combination with a frame, the obliquely-located crank-shaft with the rakes hinged thereto, substantially as described, and the holding-rods fixed to the rakes, springs secured to the rod at one end and to the frame at the other end, the wheels, revolving axle, sliding sleeve $g$ on said axle having pinions G G', the actuating-shaft F, having at its forward end the pinion $f^3$ to give motion to the crank-shaft when the rakes are used for raking hay, and the pinion $f^4$ to give motion to the same when used as a tedder, substantially as and for the purpose specified.

9. In combination with a frame, the obliquely-located crank-shaft with the rakes hinged thereto, substantially as described, and the spring-actuated rake-holding rods, the wheels, rotating axle, and gear mechanism for imparting motion from the axle to the crank-shaft, and means for shifting said gear mechanism, substantially as and for the purpose specified.

In testimony whereof I affix my signature in presence of two witnesses.

MADISON REW.

Witnesses:
M. SNYDER,
L. E. SPENCER.